(12) United States Patent
Jin et al.

(10) Patent No.: US 12,466,953 B2
(45) Date of Patent: Nov. 11, 2025

(54) RUBBER MATERIAL FOR ASPHALT ROADS HAVING BOTH SELF-STRESS ICE BREAKING AND PHASE-CHANGE SNOW MELTING FUNCTIONS AND PREPARATION METHOD THEREOF

(71) Applicant: Changsha University of Science and Technology, Changsha (CN)

(72) Inventors: Jiao Jin, Changsha (CN); Jianlong Zheng, Changsha (CN); Guoping Qian, Changsha (CN); Shuai Liu, Changsha (CN); Zhuang Wen, Changsha (CN); Ruyi Rao, Changsha (CN); Hao Xu, Changsha (CN); Yalong Zhang, Changsha (CN); Mengcheng Xiao, Changsha (CN)

(73) Assignee: Changsha University of Science and Technology, Changsha (CN)

( * ) Notice: Subject to any disclaimer, the term of this patent is extended or adjusted under 35 U.S.C. 154(b) by 0 days.

(21) Appl. No.: 19/010,406

(22) Filed: Jan. 6, 2025

(65) Prior Publication Data
US 2025/0243364 A1    Jul. 31, 2025

(30) Foreign Application Priority Data
Jan. 31, 2024 (CN) .......................... 202410128838.2

(51) Int. Cl.
*C08L 83/04* (2006.01)
*C08K 9/04* (2006.01)
*C09K 3/18* (2006.01)

(52) U.S. Cl.
CPC .............. *C08L 83/04* (2013.01); *C08K 9/04* (2013.01); *C09K 3/185* (2013.01)

(58) Field of Classification Search
CPC ............ C08K 9/04; C09K 3/185; C08L 83/04
See application file for complete search history.

(56) References Cited

U.S. PATENT DOCUMENTS

| 2016/0251558 A1 | 9/2016 | Eliyahu et al. |
| 2019/0054440 A1 | 2/2019 | Mistry et al. |

FOREIGN PATENT DOCUMENTS

| CN | 107384327 A | | 11/2017 | | |
| CN | 107417867 B | * | 2/2020 | ............ | C08F 292/00 |
| CN | 114452907 A | | 5/2022 | | |
| CN | 108034258 B | * | 11/2022 | ............... | C08L 83/04 |
| CN | 116283063 A | * | 6/2023 | ............... | C04B 26/26 |
| CN | 117986875 B | * | 7/2024 | ............... | C08L 83/07 |

OTHER PUBLICATIONS

Clarivate Analytics machine translation of CN 107384327 A to Zhang et al., published Nov. 24, 2017 (Year: 2017).*
Clarivate Analytics machine translation of CN 107417867B to Zhou et al., published Feb. 14, 2020 (Year: 2020).*
Clarivate Analytics machine translation of CN 108034258 B to He et al., published Nov. 15, 2022 (Year: 2022).*
Clarivate Analytics machine translation of CN 116283063 A to Wu et al., published Jun. 23, 2023 (Year: 2023).*
Clarivate Analytics machine translation of CN 117986875 B to Jin et al., published Jul. 26, 2024 (Year: 2024).*
Cheng et al., "preparation and performance analysis of phase change microcapsule/epoxy resin composite phase change material", Journal of Energy Storage, 47, 2022, 103581. Published online Nov. 16, 2021 (Year: 2021).*
Gao et al., "performance evaluation of new epoxy resin-based composite phase change materials and their asphalt mixture", Journal of Traffic and Transportation Engineering (English edition), 2024, 11 (3), 507-522. Published online Jun. 5, 2024 (Year: 2024).*
Jin et al., "study on preparation and properties of phase change modified asphalt for the functional pavement", Construction and Building Materials, 439, 2024, 137248. Published online Jul. 6, 2024 (Year: 2024).*
Wei et al. "effects of microencapsulated phase change materials on the performance of asphalt binders", Renewable Energy, 132, 2019, 931-940. Published online Aug. 20, 2018 (Year: 2018).*
He et al., "preparation and multi-evaluation of durability of superhydrophobic anti-icing coating on asphalt pavement", Construction and Building Materials, 441, 2024, 137587. Published online Jul. 25, 2024 (Year: 2024).*
Jin et al. "preparation and thermal properties of encapsulated ceramsite-supported phase change materials used in asphalt pavement", Construction and Building Materials, 190, 2018, 235-245. Published online Sep. 25, 2018 (Year: 2018).*
Jiao et al. "design and properties of polyurethane solid-solid phase-change granular temperature regulation asphalt mixtures", Solar Energy, 253, 2023, 47-57. Published online Feb. 18, 2023 (Year: 2023).*

(Continued)

Primary Examiner — Jane L Stanley
(74) Attorney, Agent, or Firm — George D. Morgan

(57) ABSTRACT

The present invention discloses a rubber material for asphalt roads having both self-stress ice breaking and phase-change snow melting functions and a preparation method thereof. A stable oil-in-water emulsion is prepared with n-tetradecane as a phase-change core material, then KH550 modification is performed to promote cross-linking of graphene and vinyl MQ silicone resin, and then a prepolymer is subject to hydrolytic polycondensation on a surface of the oil-in-water emulsion using an in-situ emulsion polymerization method to prepare modified graphene oxide-vinyl MQ silicone resin composite wall material phase-change microcapsules; vinyl MQ silicone resin undergoes a cross-linking reaction with hydrogen-containing silicone oil, a cross-linking agent of rubber, through active vinyl groups borne on the surface, thereby achieving a strengthening effect, effectively improving viscoelasticity and stress-strain behaviors of the silicone rubber, and preparing the rubber material for asphalt roads having both good elasticity and phase-change energy storage function.

10 Claims, 4 Drawing Sheets

(56) References Cited

OTHER PUBLICATIONS

Gong et al. "review of regulation techniques of asphalt pavement high temperature for climate change adaptation", Journal of Infrastructure Preservation and Resilience., 3, 9, 2022. Published online Jul. 3, 2022 (Year: 2022).*

Liu et al. "innovative design of microencapsulated phase change materials for thermal energy storage and versatile applications: a review", Sustainable Energy & Fuels, 2019, 3, 1091. Published online Mar. 11, 2019 (Year: 2019).*

\* cited by examiner

RUBBER MATERIAL FOR ASPHALT ROADS HAVING BOTH SELF-STRESS ICE BREAKING AND PHASE-CHANGE SNOW MELTING FUNCTIONS AND PREPARATION METHOD THEREOF

CROSS-REFERENCE TO RELATED APPLICATIONS

The application claims priority to Chinese patent application No. 2024101288382, filed on Jan. 31, 2024, the entire contents of which are incorporated herein by reference.

TECHNICAL FIELD

The present invention belongs to the technical field of ice breaking and snow melting for road engineering, and particularly relates to a rubber material for asphalt roads having both self-stress ice breaking and phase-change snow melting functions and a preparation method thereof.

BACKGROUND

In a low temperature environment in winter, asphalt pavements are prone to occurring snow accumulation and ice formation phenomena, resulting in a great reduction in the skid resistance performance of the pavements, and a great influence on smooth road traffic and safety of vehicle operation. It has been shown through investigations that the asphalt pavements have an adhesion coefficient of 0.6 under normal operating conditions, while have an adhesion coefficient of 0.15 in case that surfaces are covered with ice and snow. At this stage, road ice and snow can be removed by a technology of actively suppressing pavement ice formation, including thermally induced ice and snow melting pavements and self-stress elastic pavements.

The thermally induced ice and snow melting pavements can be achieved by adding phase-change cold storage materials to asphalt mixtures. The phase-change cold storage materials can release heat when the temperature of the asphalt pavements decreases, and plays a role in retarding pavement ice formation. By preparing phase change microcapsules, the phase-change materials can be effectively prevented from leaking, coming into direct contact with road materials, and affecting the use performance of roads. While current low-temperature phase-change microcapsules have low snow melting efficiency during use, and are easily deformed and broken under an action of external loads, resulting in loss of the phase-change materials.

The self-stress elastic pavements are mainly achieved by adding materials having high elasticity like rubber particles to asphalt mixtures. Under the action of external loads, the elastic materials undergo large deformation to break ice layers of the pavements, thereby playing a role in suppressing ice formation on the pavements. However, the addition of too much elastic material results in a decrease in the durability of the mixes and difficulties in forming; and the ice breaking effect is limited by thicknesses of the ice layers, and cracks and flaking cannot be produced if the thicknesses are too large.

SUMMARY

In view of the above problems, an object of the present invention is to provide a rubber material for asphalt roads having both self-stress ice breaking and phase-change snow melting functions and a preparation method thereof. The rubber material has a matrix of addition type molding liquid silicone rubber and a filler of modified graphene oxide-vinyl MQ silicone resin composite wall material phase-change microcapsules, has both self-stress ice breaking and phase-change snow melting functions, and effectively solves problems of road snow accumulation and ice formation.

In order to achieve the above technical object, the present invention adopts technical solutions as follows:

A preparation method for a rubber material for asphalt roads having both self-stress ice breaking and phase-change snow melting functions, comprising the following steps:

(1) evenly stirring n-tetradecane with a surfactant to form an oil phase; dissolving polyvinyl alcohol evenly in water to form an aqueous phase; adding the oil phase slowly into the aqueous phase, and adding sodium chloride to form an evenly-dispersed oil-in-water core material emulsion;

(2) mixing KH550 (3-Aminopropyltriethoxysilane, CAS No. 919-30-2), absolute ethanol, water and graphene oxide, and sufficiently stirring to be even under a heating condition to obtain a modified graphene oxide dispersion liquid;

(3) mixing tetramethyldivinyldisiloxane, absolute ethanol and water, sufficiently stirring to be even under a heating condition, and then adding hexamethyldisiloxane, tetraethoxysilane and the modified graphene oxide dispersion liquid of step (2) in sequence to obtain a modified graphene oxide-containing prepolymer solution;

(4) mixing the oil-in-water core material emulsion of step (1) and the modified graphene oxide-containing prepolymer solution of step (3), and adding dropwise hydrochloric acid to adjust a pH to 5-6, and sufficiently polymerizing under a heating condition to obtain modified graphene oxide-vinyl MQ silicone resin composite wall material phase-change microcapsules;

(5) mixing the modified graphene oxide-vinyl MQ silicone resin composite wall material phase-change microcapsules of step (4) and vinyl silicone oil, and sufficiently stirring to be even to serve as a component A; mixing hydrogen-containing silicone oil, an inhibitor and a catalyst, and sufficiently stirring to be even to serve as a component B; and mixing the component A and the component B, sufficiently stirring to be even, and drying to obtain the rubber material.

Further, in step (1), a mass ratio of the n-tetradecane to the surfactant to the polyvinyl alcohol to the water to the sodium chloride is 20-25:1.3-1.6:1.2-1.5:100-150:1.3-1.7, the surfactant is formed by compounding any one of Span®-40 (Sorbitan monopalmitate, CAS No. 26266-57-9), Span®-60 (Sorbitan monostearate, CAS No. 1338-41-6), Span®-80 (Sorbitan monooleate, CAS No. 1338-43-8) with any one of Tween®-40 (Polyoxyethylene sorbitan monopalmitate, CAS No. 9005-66-7), Tween®-60 (Polyoxyethylene sorbitan monostearate, CAS No. 9005-67-8), Tween®-80 (Polyoxyethylene sorbitan monooleate, CAS No. 9005-65-6), and an HLB value of the surfactant is 11.2-11.8.

Further, in step (2), a mass ratio of the KH550 to the absolute ethanol to the water to the graphene oxide is 1.5-2:6.5-7.5:0.6-1.2:0.1-0.5, and a temperature of heating is 60-70° C.

Further, in step (3), a mass ratio of the tetramethyldivinyldisiloxane to the absolute ethanol to the water is 2.5-3.2:8-12:25-30; a temperature of heating is 40-45° C.; and a mass ratio of the hexamethyldisiloxane to the tetraethoxysilane to the modified graphene oxide dispersion liquid is 9-12:10-20:7-9.

Further, in step (4), a mass ratio of the oil-in-water core material emulsion to the modified graphene oxide-containing prepolymer solution is 1-1.25:1, and a temperature of heating is 60-75° C.

Further, in step (5), a mass ratio of the modified graphene oxide-vinyl MQ silicone resin composite wall material phase-change microcapsules to the vinyl silicone oil is 10-30:10-55, and the vinyl silicone oil is one of vinyl-terminated polydimethylsiloxanes having a viscosity of 300-5000 mPa·s.

Further, in step (5), a mass ratio of the component A to the component B is 5-10:2-7.

Further, in step (5), a mass ratio of the hydrogen-containing silicone oil to the inhibitor to the catalyst is 8-20:0.015-0.045:0.045-0.075, the hydrogen-containing silicone oil is one of terminal side hydrogen-containing silicone oils having a hydrogen content of 0.36%-1.65%; the inhibitor is any one or combinations of 1-ethynyl-1-cycloethanol, 3-methyl-1-ethynyl-3-ol, 2-methyl-3-butynyl-2-ol; and the catalyst is any one or combinations of a platinum catalyst, such as chloroplatinic acid (also known as OK-PT-30) and hexachloroplatinic acid (also known as KP30).

Further, in step (5), a temperature of drying is 55-70° C.

The present invention also provides a rubber material for asphalt roads having both self-stress ice breaking and phase-change snow melting functions prepared by the above preparation method.

According to the present invention, a stable oil-in-water emulsion is prepared with n-tetradecane as a phase-change core material, an interlayer spacing is then increased by a hydroxyl condensation reaction of a KH550 modifier with a surface of graphene oxide, thereby promoting cross-linking of graphene and vinyl MQ silicone resin, and then a modified graphene oxide-containing prepolymer is subject to hydrolytic polycondensation on a surface of the oil-in-water emulsion using an in-situ emulsion polymerization method to prepare modified graphene oxide-vinyl MQ silicone resin composite wall material phase-change microcapsules; further, vinyl MQ silicone resin undergoes a cross-linking reaction with hydrogen-containing silicone oil, a cross-linking agent of rubber, through active vinyl groups borne on the surface of silicone resin, forming network crosslinking points to be fixed inside the rubber in a chemically cross-linked mode, increasing the cross-linking density of the rubber, thereby achieving a strengthening effect, effectively improving viscoelasticity and stress-strain behaviors of the silicone rubber, and finally preparing the rubber material for asphalt roads having both good elasticity and phase-change energy storage functions; and incorporating the rubber material into asphalt mixtures in an aggregate form can allow the asphalt roads to have both self-stress ice breaking and phase-change snow melting functions, effectively solving problems of snow accumulation and ice formation of the roads.

The present invention has the advantages that:
(1) Based on the problem of serious thermal decomposition of n-tetradecane in hot-mix asphalt mixtures, the present invention guarantees efficient stability of phase-change functions of the rubber material for asphalt roads by compounding cladding of the n-tetradecane with vinyl MQ silicone resin and addition type molding liquid silicone rubber.
(2) The modified graphene oxide-vinyl MQ silicone resin composite wall material phase-change microcapsules are added to the addition type molding liquid silicone rubber as a reinforcing filler, a cross-linking reaction occurs through active vinyl groups borne on the surface of silicone resin with hydrogen-containing silicone oil, a cross-linking agent of rubber to form network cross-linking points to be fixed inside the rubber in a chemical cross-linking mode, increasing the cross-linking density of the rubber, thereby achieving a reinforcing effect, effectively improving the viscoelasticity and stress strain behaviors of the silicone rubber, and ensuring the long-life durability of the self-stress ice breaking function of the rubber material for asphalt roads.
(3) Based on the difficulty of even dispersion of graphene oxide into rubber high molecular polymers, the thermal continuity of a thermal conduction path of the rubber material for asphalt roads is guaranteed by first conducting covalent functionalization on it, then compounding with vinyl MQ silicone resin to generate a capsule wall-wrapped phase-change core material, and finally adding it into the addition type molding liquid silicone rubber in a form of microcapsules.

DETAILED DESCRIPTION OF THE EMBODIMENTS

Figure 1:
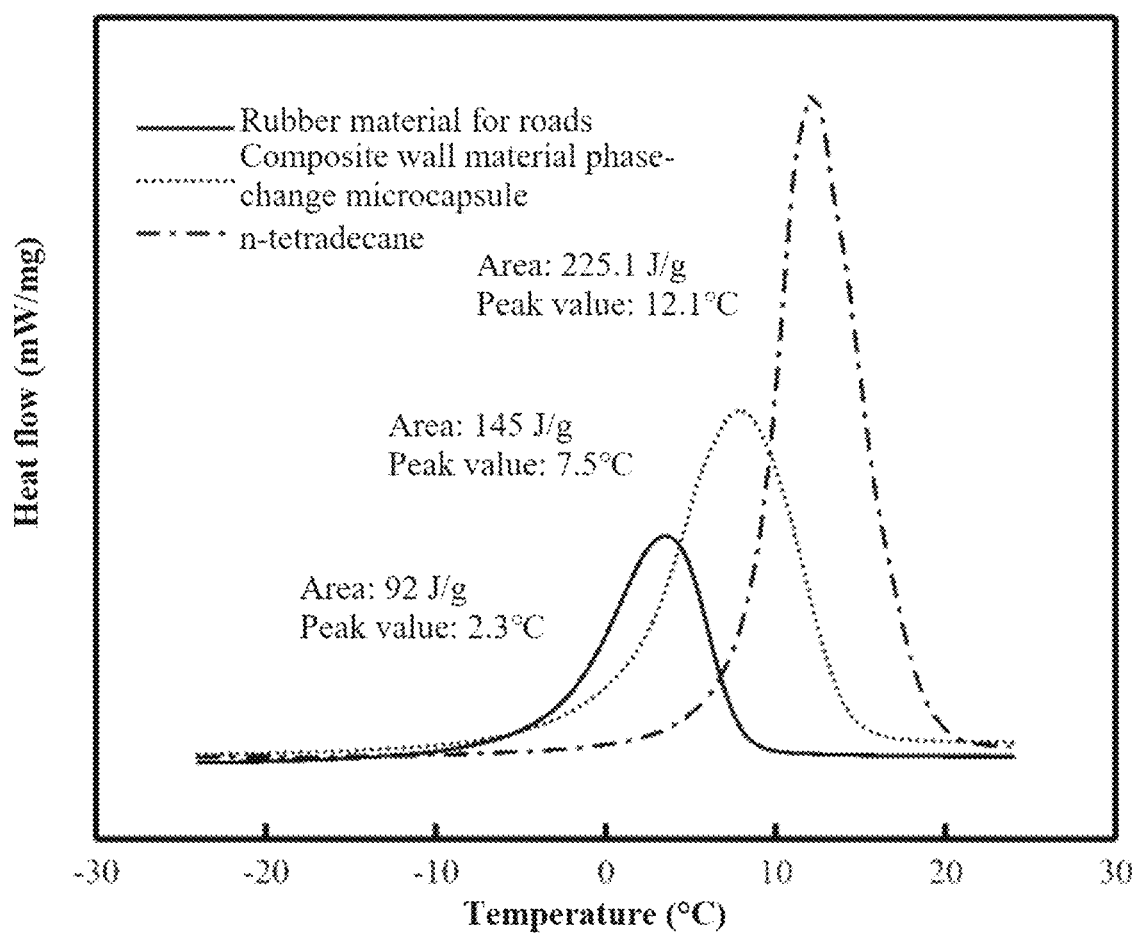
FIG. 1 is a DSC graph of various components of a rubber material for asphalt roads of Embodiment 1.

The following embodiments are merely intended to further illustrate the present invention, but implementations of the present invention are not limited thereto.

Embodiment 1

A preparation method for a rubber material for asphalt roads having both self-stress ice breaking and phase-change snow melting functions, comprising the following steps:
(1) evenly mixing 22 g of n-tetradecane with 1.5 g of Span®-60/Tween®-60 complex surfactant in a mass ratio of 0.35:0.65 to form an oil phase; evenly dissolving 1.35 g of polyvinyl alcohol in 125 g of water to form an aqueous phase; subsequently slowly adding the oil phase to the aqueous phase, and adding 1.5 g of sodium chloride; stirring at a rotating speed of 500 rpm in a constant temperature water bath at 25° C. for 30 min to form a stable evenly-dispersed oil-in-water core material emulsion;
(2) adding 1.75 g of KH550, 7 g of absolute ethanol and 0.9 g of deionized water into a beaker and mixing and stirring, then adding 0.3 g of graphene oxide powder, placing under a water bath condition at 65° C. for heating and stirring for 6.5 h, allowing graphene oxide to sufficiently react with KH550, and finally forming a stable modified graphene oxide dispersion liquid;
(3) adding 2.9 g of tetramethyldivinyldisiloxane, 10 g of ethanol and 27.5 g of deionized water into a beaker, continuously stirring for 15 min after heating to 40° C., and after the temperature is stabilized, sequentially adding 10.5 g of hexamethyldisiloxane, 15 g of tetraethoxysilane and 8 g of modified graphene oxide dispersion liquid to prepare a modified graphene oxide-containing prepolymer solution;

(4) mixing the modified graphene oxide-containing prepolymer solution with the oil-in-water core material emulsion in a mass ratio of 1:1.15, dropwise adding hydrochloric acid until a pH of the solution is 6, then placing in a constant temperature water bath at 75° C. for stirring at 1200 rpm for 6 h, and sufficiently polymerizing to obtain a reaction product; removing ethanol by distillation, extracting with toluene, washing with an aqueous potassium hydroxide solution three times, washing with distilled water until neutral, adding anhydrous sodium sulfate to remove residual moisture, removing the toluene by rotary evaporation, finally performing vacuum drying, and obtaining modified graphene oxide-vinyl MQ silicone resin composite wall material phase-change microcapsule powder after grinding;

(5) evenly stirring the vinyl-terminated polydimethylsiloxane having a viscosity of 3500 mPa·s with the modified graphene oxide-vinyl MQ silicone resin composite wall material phase-change microcapsules at a mass ratio of 32:20 at 4000 rpm to serve as a component A;

(6) evenly stirring terminal side hydrogen-containing silicone oils having a hydrogen content of 1.25%, 1-ethynyl-1-cycloethanol and a platinum catalyst at a mass ratio of 19:0.035:0.055 at 4000 rpm to serve as a component B;

(7) adding the component B into the component A at a mass ratio of the component A to the component B being 5:3, after stirring at 3500 rpm for 5 h to a uniform system, pouring a rubber material into a polytetrafluoroethylene mold, placing in a vacuum drying oven to evacuate vacuum for bubble removal, and finally moving to an oven for drying to obtain the rubber material for asphalt roads having both self-stress ice breaking and phase-change snow melting functions.

Comparative Example 1

A preparation method for a rubber material for asphalt roads having both self-stress ice breaking and phase-change snow melting functions, comprising the following steps:

(1) evenly mixing 22 g of n-tetradecane with 1.5 g of Span®-60/Tween®-60 complex surfactant in a mass ratio of 0.35:0.65 to form an oil phase; evenly dissolving 1.35 g of polyvinyl alcohol in 125 g of water to form an aqueous phase; subsequently slowly adding the oil phase to the aqueous phase, and adding 1.5 g of sodium chloride; stirring at a rotating speed of 500 rpm in a constant temperature water bath at 25° C. for 30 min to form a stable evenly-dispersed oil-in-water core material emulsion;

(2) adding 2.9 g of tetramethyldivinyldisiloxane, 10 g of ethanol and 27.5 g of deionized water into a beaker, continuously stirring for 15 min after heating to 40° C., and after the temperature is stabilized, sequentially adding 10.5 g of hexamethyldisiloxane and 15 g of tetraethoxysilane to prepare a modified graphene oxide-containing prepolymer solution;

(3) mixing the prepolymer solution with the oil-in-water core material emulsion in a mass ratio of 1:1.15, dropwise adding hydrochloric acid until a pH of the solution is 6, then placing in a constant temperature water bath at 75° C. for stirring at 1200 rpm for 6 h, and sufficiently polymerizing to obtain a reaction product; removing ethanol by distillation, extracting with toluene, washing with an aqueous potassium hydroxide solution three times, washing with distilled water until neutral, adding anhydrous sodium sulfate to remove residual moisture, removing the toluene by rotary evaporation, finally performing vacuum drying, and obtaining vinyl MQ silicone resin composite wall material phase-change microcapsule powder after grinding;

(4) evenly stirring the vinyl-terminated polydimethylsiloxane having a viscosity of 3500 mPa's with the vinyl MQ silicone resin composite wall material phase-change microcapsules at a mass ratio of 32:20 at 4000 rpm to serve as a component A;

(5) evenly stirring terminal side hydrogen-containing silicone oils having a hydrogen content of 1.25%, 1-ethynyl-1-cycloethanol and a platinum catalyst at a mass ratio of 19:0.035:0.055 at 4000 rpm to serve as a component B;

(6) adding the component B into the component A at a mass ratio of the component A to the component B being 5:3, after stirring at 3500 rpm for 5 h to a uniform system, pouring a rubber material into a polytetrafluoroethylene mold, placing in a vacuum drying oven to evacuate vacuum for bubble removal, and finally moving to an oven for drying to obtain the rubber material for asphalt roads having self-stress ice breaking and phase-change snow melting functions.

Performance Testing:

(1) Various components of a preparation process of Embodiment 1 are subjected to DSC testing, with testing results shown in FIG. 1. As can be seen from FIG. 1, the pure n-tetradecane has a melting enthalpy value of 225.1 J/g and a phase transition peak temperature of 12.1° C., and the modified graphene oxide-vinyl MQ silicone resin composite wall material phase-change microcapsules have a melting enthalpy value up to 145 J/g, indicating that the prepared phase-change microcapsules have a higher heat storage capacity, a phase change peak temperature becomes 7.5° C., and a peak width is larger than that of the pure n-tetradecane, with the main reason that after the n-tetradecane is coated, the heat transfer resistance is increased due to the barrier action of a silica shell layer, and the phase change process of the n-tetradecane is retarded. After the addition of the microcapsules to the liquid silicone rubber, the prepared rubber material still has an enthalpy value of 92 J/g and a peak temperature of 2.3° C., indicating that the rubber material is capable of timely releasing stored heat in winter to perform a phase-change snow melting function.

Figure 2:
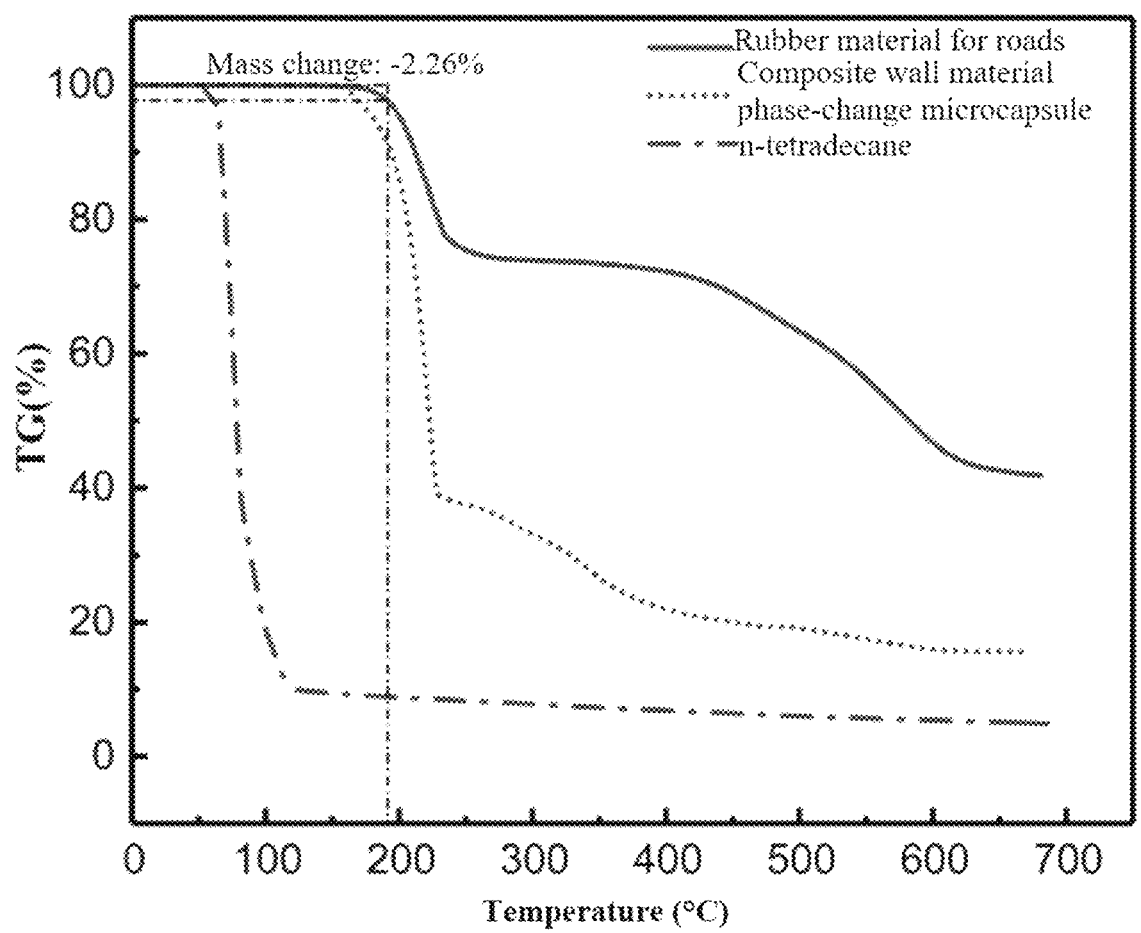
FIG. 2 is a TG graph of various components of the rubber material for asphalt roads of Embodiment 1.

(2) Various components of a preparation process of Embodiment 1 are subjected to TG testing, with testing results shown in FIG. 2. As can be seen from FIG. 2, the n-tetradecane is substantially thermally decomposed at around 100° C., has poor thermal stability, is liquid at normal temperature, and cannot be directly added to asphalt pavements. The thermal stability of the n-tetradecane is significantly improved by coating the n-tetradecane with composite wall materials to form microcapsules, and then adding the microcapsules to the liquid silicone rubber. The mass loss of the n-tetradecane is only 2.26% at 200° C., indicating that good thermal stability of the rubber material for roads is maintained at a working temperature of hot-mix asphalt mixtures.

Figure 3:
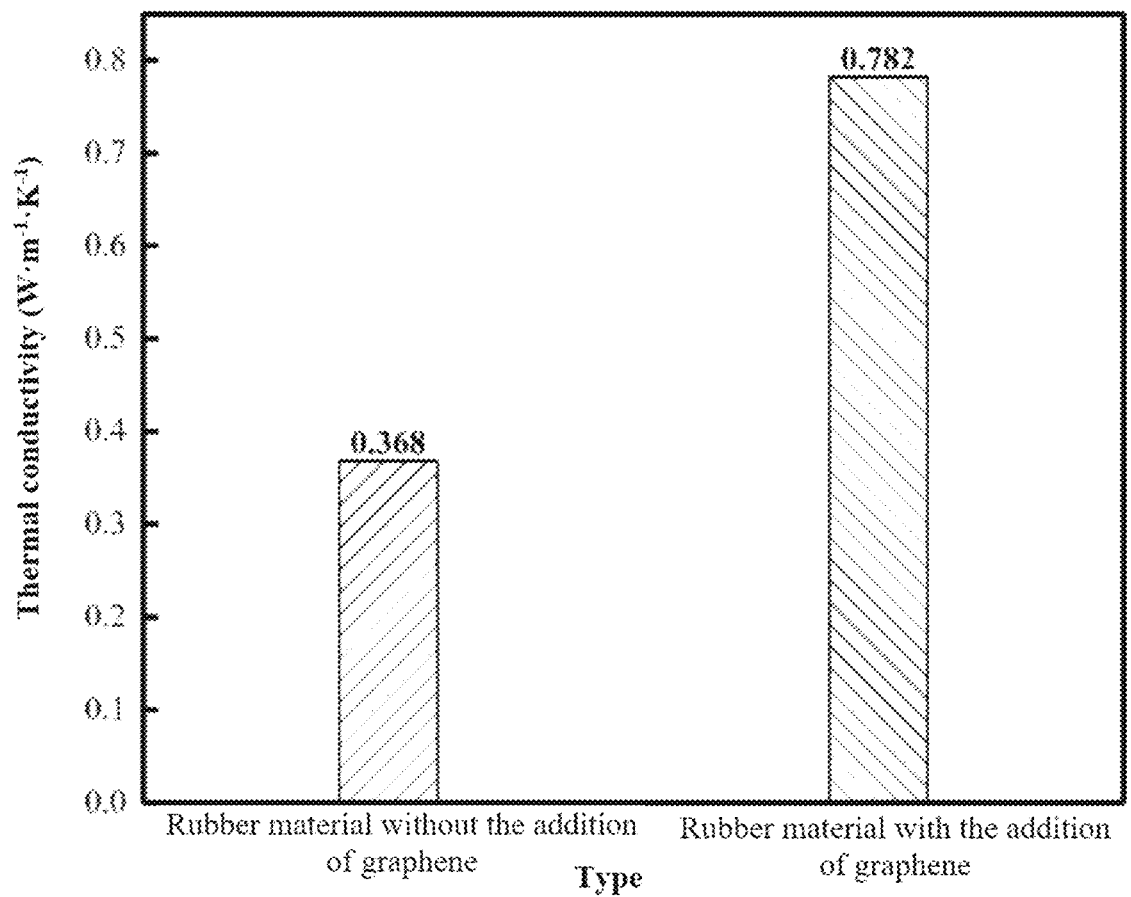
FIG. 3 is a thermal conductivity graph of the rubber material for asphalt roads of Embodiment 1 versus a rubber material for asphalt roads without the addition of modified graphene oxide of Comparative Example 1.

(3) The rubber materials prepared in Embodiment 1 and Comparative Example 1 are subjected to thermal conductivity testing. The thermal conductivity is measured according to a transient plane source method, with testing results shown in FIG. 3. As can be seen from FIG. 3, the addition of the modified graphene oxide effectively increases the thermal conductivity of the rubber material, and the thermal conductivity of the rubber material prepared in Embodiment 1 is as high as 0.782 W·m$^{-1}$·K$^{-1}$, which is increased by 52.94% compared to the rubber material without the addition of the modified graphene oxide in Comparative Example 1. It is indicated that the modified graphene oxide can enhance stable and broad thermal conduction paths for phase-change rubber materials. In addition, the graphene oxide and the microcapsules are compounded to be then added to rubber, making it more uniformly dispersed, not easily curled, capable of maintaining a draw ratio, and capable of more easily forming thermally conductive paths.

Figure 4:
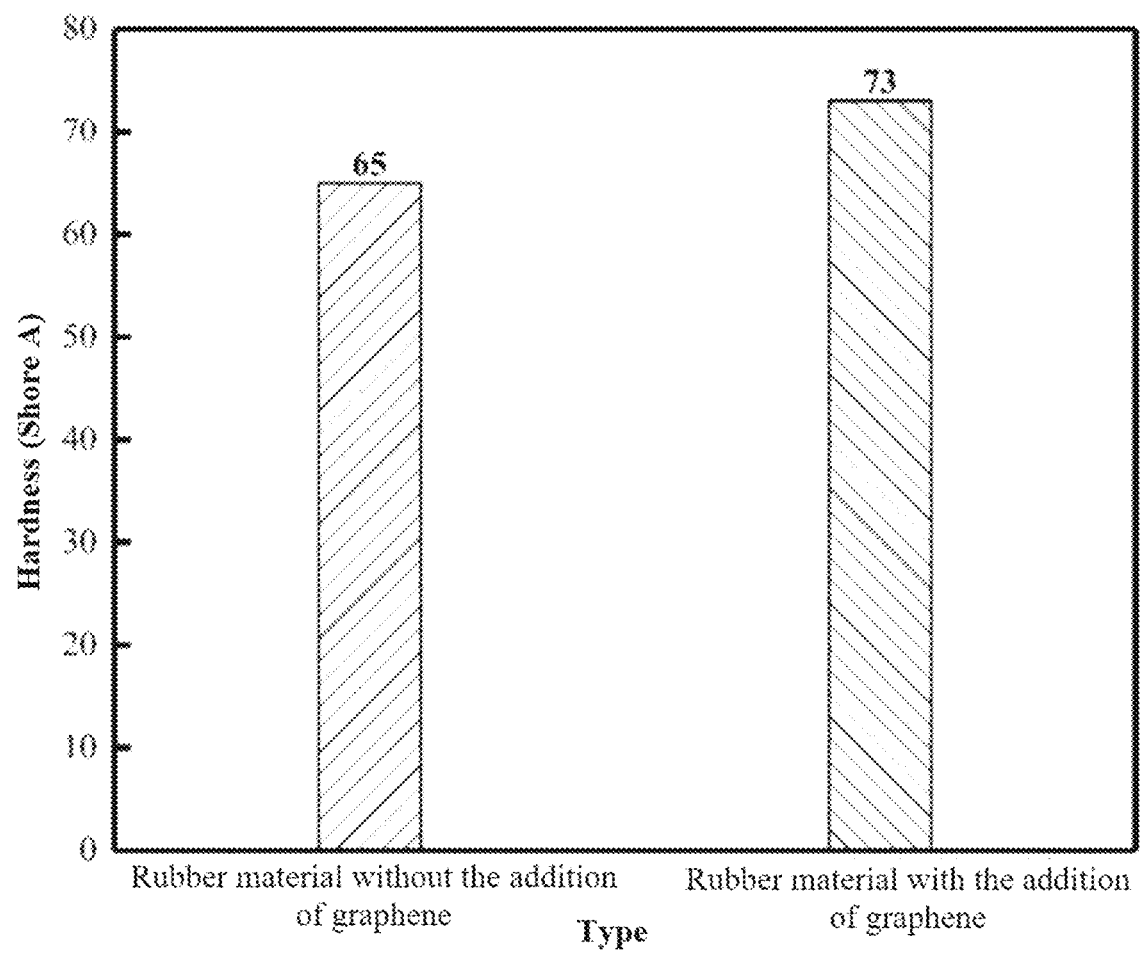
FIG. 4 is a Shore A hardness graph of the rubber material for asphalt roads of Embodiment 1 versus the rubber material for asphalt roads without the addition of modified graphene oxide of Comparative Example 1.

(4) The rubber materials prepared in Embodiment 1 and Comparative Example 1 are subjected to mechanical property testing. The rubber hardness is measured using a Shore A durometer, with testing results shown in FIG. 4. As can be seen from FIG. 4, the rubber materials prepared in Embodiment 1 and Comparative Example 1 have a hardness of 73 HA and 65 HA, respectively, which both satisfy the technical index that the shore hardness of rubber particles for self-stress asphalt pavements needs to exceed 55 HA. It is indicated that the addition of vinyl MQ silicone resin wall material phase-change microcapsules as a reinforcing filler to the addition type molding liquid silicone rubber can effectively increase the surface hardness and mechanical properties of the liquid silicone rubber. In addition, the addition of the modified graphene oxide allows the rubber material prepared in Embodiment 1 to have greater hardness, indicating that graphene can also improve the mechanical properties of a portion of the silicone rubber material.

What is claimed is:

1. A preparation method for a rubber material for asphalt roads having both self-stress ice breaking and phase-change snow melting functions, wherein the preparation method comprises the following steps:
   (1) evenly stirring n-tetradecane with a surfactant to form an oil phase; dissolving polyvinyl alcohol evenly in water to form an aqueous phase; adding the oil phase slowly into the aqueous phase, and adding sodium chloride to form an evenly dispersed oil-in-water core material emulsion;
   (2) mixing 3-aminopropyltriethoxysilane, absolute ethanol, water and graphene oxide, and stirring under a heating condition to obtain a modified graphene oxide dispersion liquid;
   (3) mixing tetramethyldivinyldisiloxane, absolute ethanol and water, stirring under a heating condition, and then adding hexamethyldisiloxane, tetraethoxysilane and the modified graphene oxide dispersion liquid of step (2) in sequence to obtain a modified graphene oxide-containing prepolymer solution;
   (4) mixing the oil-in-water core material emulsion of step (1) and the modified graphene oxide-containing prepolymer solution of step (3), and adding dropwise hydrochloric acid to adjust a pH to 5-6, and polymerizing under a heating condition to obtain modified graphene oxide-vinyl MQ silicone resin composite wall material phase-change microcapsules;
   (5) mixing the modified graphene oxide-vinyl MQ silicone resin composite wall material phase-change microcapsules of step (4) and a vinyl silicone oil, and stirring to serve as a component A; mixing a hydrogen-containing silicone oil, an inhibitor and a catalyst, and stirring to serve as a component B; and mixing the component A and the component B, stirring and drying to obtain the rubber material.

2. The preparation method according to claim 1, wherein in step (1), the mass ratio of the n-tetradecane to the surfactant to the polyvinyl alcohol to the water to the sodium chloride is 20-25:1.3-1.6:1.2-1.5:100-150:1.3-1.7, the surfactant is formed by compounding any one of sorbitan monopalmitate, sorbitan monostearate, sorbitan monooleate with any one of polyoxyethylene sorbitan monopalmitate, polyoxyethylene sorbitan monostearate, polyoxyethylene sorbitan monooleate, and the surfactant has an HLB value of 11.2-11.8.

3. The preparation method according to claim 1, wherein in step (2), the mass ratio of the 3-aminopropyltriethoxysilane to the absolute ethanol to the water to the graphene oxide is 1.5-2:6.5-7.5:0.6-1.2:0.1-0.5, and the temperature of heating is 60-70° C.

4. The preparation method according to claim 1, wherein in step (3), the mass ratio of the tetramethyldivinyldisiloxane to the absolute ethanol to the water is 2.5-3.2:8-12:25-30; the temperature of heating is 40-45° C.; and the mass ratio of the hexamethyldisiloxane to the tetraethoxysilane to the modified graphene oxide dispersion liquid is 9-12:10-20:7-9.

5. The preparation method according to claim 1, wherein in step (4), the mass ratio of the oil-in-water core material emulsion to the modified graphene oxide-containing prepolymer solution is 1-1.25:1, and the temperature of heating is 60-75° C.

6. The preparation method according to claim 1, wherein in step (5), the mass ratio of the modified graphene oxide-vinyl MQ silicone resin composite wall material phase-change microcapsules to the vinyl silicone oil is 10-30:10-55, and the vinyl silicone oil is a vinyl-terminated polydimethylsiloxanes having a viscosity of 300-5000 mPa·s.

7. The preparation method according to claim 1, wherein in step (5), the mass ratio of the component A to the component B is 5-10:2-7.

8. The preparation method according to claim 1, wherein in step (5), the mass ratio of the hydrogen-containing silicone oil to the inhibitor to the catalyst is 8-20:0.015-0.045:0.045-0.075, the hydrogen-containing silicone oil is a terminal hydrogen-containing silicone oils having a hydrogen content of 0.36%-1.65%; the inhibitor is any one or combinations of 1-ethynyl-1-cycloethanol, 3-methyl-1-ethynyl-3-ol, or 2-methyl-3-butynyl-2-ol; and the catalyst is a platinum catalyst.

9. The preparation method according to claim 1, wherein in step (5), the temperature of drying is 55-70° C.

10. A rubber material for asphalt roads having both self-stress ice breaking and phase-change snow melting functions prepared by the preparation method according to claim 1.

* * * * *